United States Patent [19]

Loeffler

[11] E Re. 29,176

[45] Reissued Apr. 12, 1977

[54] PRODUCT PRESSURIZED COMPRESSED AIR DISPENSER

[75] Inventor: Herbert H. Loeffler, Arlington, Mass.

[73] Assignee: Arthur D. Little, Inc., Cambridge, Mass.

[22] Filed: Feb. 17, 1976

[21] Appl. No.: 658,669

Related U.S. Patent Documents

Reissue of:

[64] Patent No.: 3,910,465
Issued: Oct. 7, 1975
Appl. No.: 520,946
Filed: Nov. 4, 1974

[52] U.S. Cl. ..... 222/389; 222/401; 239/357; 239/322; 239/349

[51] Int. Cl.[2] ..... B67D 5/54

[58] Field of Search ..... 222/389, 193, 378, 383, 222/401; 239/357, 322, 349

[56] References Cited

UNITED STATES PATENTS

| | | | |
|---|---|---|---|
| 3,583,491 | 6/1971 | Lindeberg | 239/322 |
| 3,756,474 | 9/1973 | Riccio | 222/383 |
| 3,764,046 | 10/1973 | Riccio | 222/193 |
| 3,788,525 | 1/1974 | Thornton | 222/193 |
| 3,788,556 | 1/1974 | Riccio | 222/193 |
| 3,860,150 | 1/1975 | Maier | 222/193 |
| 3,861,564 | 1/1975 | Loeffler | 222/193 X |

*Primary Examiner*—Allen N. Knowles
*Attorney, Agent, or Firm*—Wenderoth, Lind & Ponack

[57] ABSTRACT

A fluent product dispenser in which the product is dispensed by means of compressed air has a dispenser body having a dispensing means therein for mixing and dispersing the fluent product and compressed air has a piston-cylinder means thereon by which the air is compressed, and when it reaches a certain predetermined pressure, is suddenly released. The fixed member of the piston-cylinder means has a fluent product containing recess opening toward the movable member of the piston-cylinder means, and a product pressurizing piston in the product containing recess has an end exposed toward the movable member or the piston-cylinder means. A product control valve means controls the flow of product from the product containing recess to the dispensing nozzle through the body. Likewise, a compressed air valve opens to permit flow of compressed air through a compressed air path in the body to the nozzle when the compressed air reaches a certain predetermined pressure. A product valve actuator is coupled to the product valve and is open to the compressed air flow path to open the product valve in a predetermined time relationship to the opening of the compressed air valve means, so that when the movable member of the piston-cylinder means is moved toward the fixed member for compressing air, the compressed air acts on the product pressurizing piston for pressurizing the product, and when the compressed air is released from the piston-cylinder means it actuates the product valve and releases the product only upon release of compressed air.

15 Claims, 3 Drawing Figures

PRODUCT PRESSURIZED COMPRESSED AIR DISPENSER

Matter enclosed in heavy brackets [ ] appears in the original patent but forms no part of this reissue specification; matter printed in italics indicates the additions made by reissue.

This invention relates to a dispenser for dispensing a fine spray of a fluent product by means of compressed air, and more particularly relates to such a dispenser in which the product to be dispensed is pressurized and mixed with the compressed air in the nozzle to create a fine spray with a good pattern of droplets and a relatively large proportion of the spray being droplets of extremely fine size.

BACKGROUND AND PRIOR ART

Recent developments in the aerosol dispenser art have been along the lines of providing a dispenser in which the fluent product is dispensed by means of compressed air, rather than by one of the conventional propellants, such as Freon or the like. The toxic properties of Freon have been a subject of concern, and the development of compressed air type dispensers avoids the use of Freon, thus avoiding the problems associated therewith.

Recently developed dispensers which use a charge of compressed air to aspirate a product from a separate product container each time the dispenser is actuated are found in U.S. Pat. Nos. 3,672,545 and 3,733,010. However, these dispensers do not produce a spray with droplets of a size thought to be desirable for a medicament containing inhalent. Thus, in U.S. application Ser. No. 411,267, filed Oct. 31, 1973, now abandoned, in the name of Roger B. Caron et al, there is disclosed a dispenser in which fine droplets on the order of 1 to 10 microns can be generated in such a compressed air type dispenser by exerting a pressure on the product. Droplets of this size are thought to be most effective for an inhalent.

However, the apparatus of this lastmentioned application for generating the charge of compressed air and exerting a pressure on the product at the time of the release of the compressed air so as to dispense the product is somewhat complicated. Thus far, it has been the practice to exert this pressure on the product by means of mechanical actuation of a piston in contact with the product by a mechanical connection between the compressed air compressing means and the piston, or to exert a pressure on the product by means of the force exerted by the hand of the user of the dispenser directly on the product through the container for the product.

The type of dispenser in which pressure is exerted on the fluent product by means of a product pressurizing piston mechanically actuated by the compressed air means is somewhat complex in structure, requiring a number of parts and rather complicated shapes of parts, which are difficult to mold, such as in a material like plastic. The type of dispenser in which the pressure is exerted on the product by the force exerted by the hand of the user can be made in a somewhat less complicated manner, but again a number of parts are necessary, and the pressure is not always properly coordinated with the pressure exerted on the means for compressing the air.

Further, the structure of these devices does not lend itself readily to easily controlling the relative pressure of the compressed air charge relative to the pressurized product.

It is desirable to have such a device which has a simple construction, i.e. relatively few parts, and a structure which makes it possible to shape the parts in relatively simple shapes so that they are easily molded on conventional molding apparatus. It is further desirable to have such a structure in which the relative pressures of the compressed air and the pressurized product at the nozzle where they are mixed can be easily controlled by varying the structural features of the device. Technical progress in the art of such aerosol dispensers would be achieved if such a device could be provided.

OBJECTS AND SUMMARY OF THE INVENTION

It is accordingly an object of the present invention to provide a dispensing device for dispensing fluent material by means of a charge of compressed air, in which the fluent material is also pressurized and the pressurized product and compressed air are mixed at a dispensing nozzle, and which structure has relatively few parts, which parts are easily molded in plastic on conventional apparatus, and which parts are easily assembled into the final device.

It is a further object of the present invention to provide such a dispenser in which the operation is reliable, yet simple, and in which the relative pressure of the product and the compressed air can be easily controlled by varying the sizes of orifices in the device, or varying the position of orifices in the device.

These objects are achieved by a dispenser in which a dispenser body having a dispensing means therein for mixing and dispersing the fluent product and compressed air has a piston-cylinder means thereon by which the air is compressed, and when it reaches a certain predetermined pressure, is suddenly released. The fixed member of the piston-cylinder means has a fluent product containing recess opening toward the movable member of the piston-cylinder means, and a product pressurizing piston in the product containing recess has an end exposed toward the movable member or the piston-cylinder means. A product control valve means controls the flow of product from the product containing recess to the dispensing nozzle through the body. Likewise, a compressed air valve opens to permit flow of compressed air through a compressed air path in the body to the nozzle when the compressed air reaches a certain predetermined pressure. A product valve actuator is coupled to the product valve to open the product valve in a predetermined timed relationship to the opening of the compressed air valve means, so that when the movable member of the piston-cylinder means is moved toward the fixed member for compressing air, the compressed air acts on the product pressurizing piston for pressurizing the product.

The product value actuator can be opened to the compressed air flow path, so that the product valve actuator is movable in response to the pressure of the compressed air flowing in the path when it is released from the piston-cylinder means so as to actuate the product valve and release the product only upon release of compressed air.

BRIEF DESCRIPTION OF THE DRAWINGS

The invention will be described in greater detail hereinafter in connection with the accompanying drawings, in which.

DETAILED DESCRIPTION OF THE INVENTION

Figure 1:
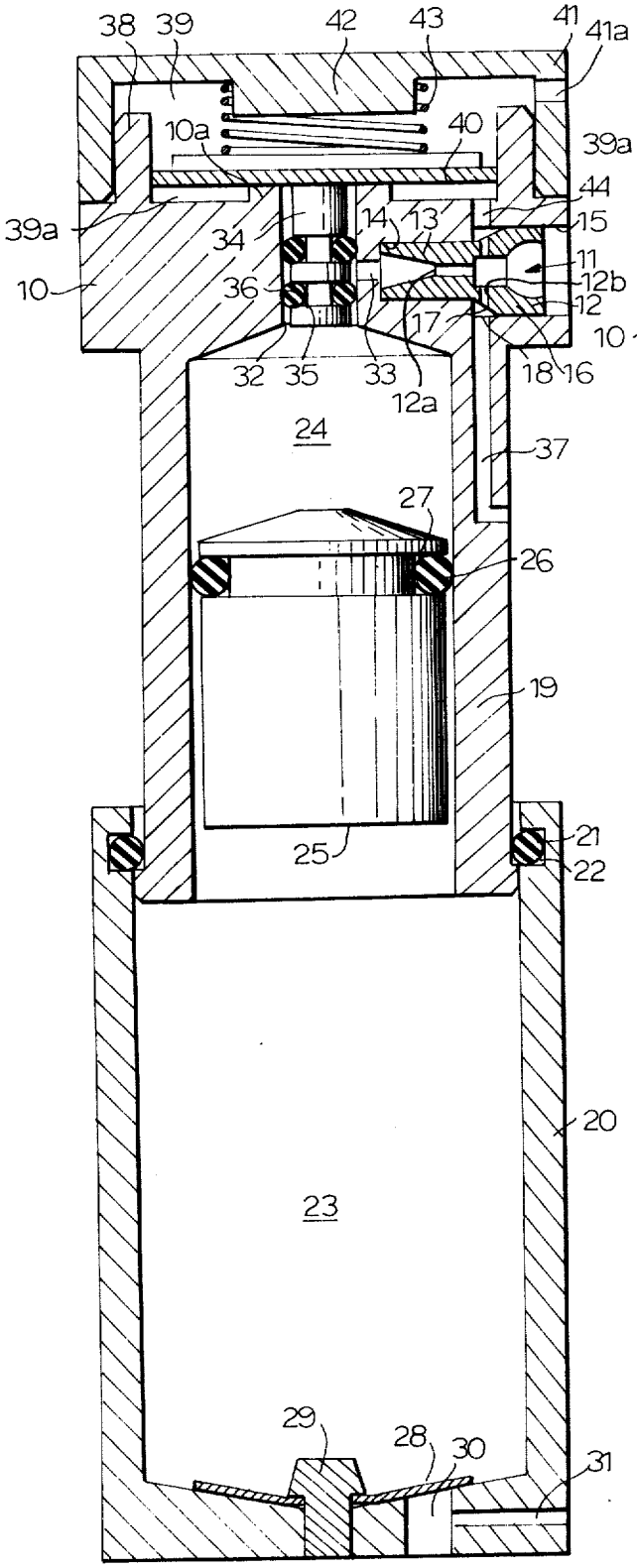
FIG. 1 is a sectional elevation of a first embodiment of the dispensing device according to the present invention, with the parts in position at the start of a dispensing operation.
Figure 2:
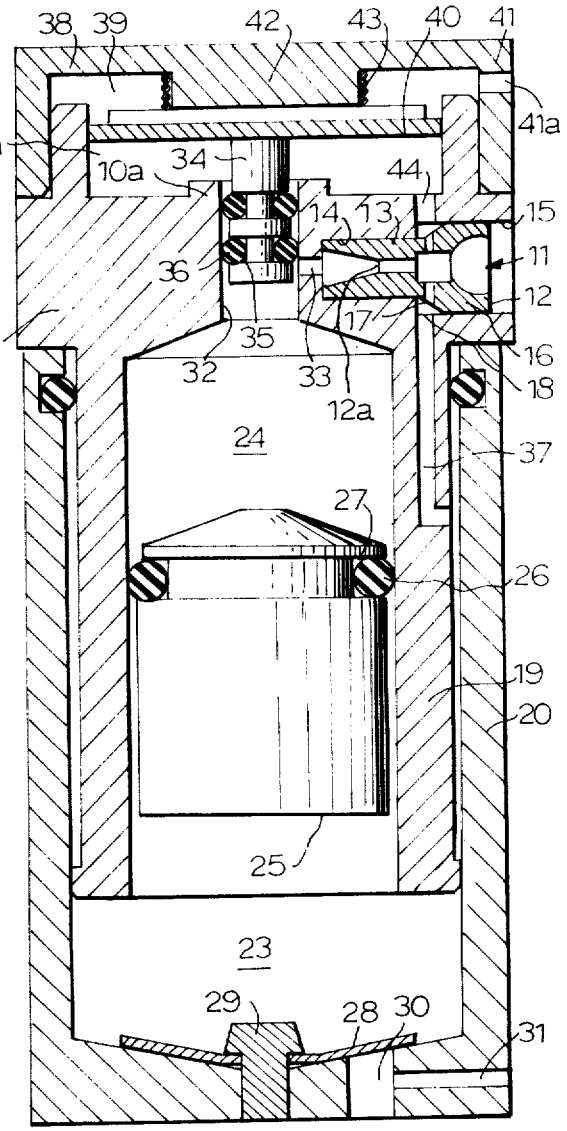
FIG. 2 is a view similar to FIG. 1 with the parts in positions at the end of a dispensing operation.

Referring first to the FIGS. 1 and 2, the dispenser shown therein has a body 10 having a dispensing nozzle means 11 therein. This dispensing nozzle means is constituted by a nozzle insert 12 having a smaller diameter inner portion 13 fitted tightly in a smaller diameter recess 14 which is at the bottom of a larger diameter recess 15 opening laterally from the body 10. The nozzle insert 12 has a central Venturi passage 12a and lateral passages 12b. It further has larger diameter portion 16 which fits into the larger diameter recess 15. The inner end of the larger diameter portion 16 is beveled at 17 so as to leave a compressed air supply chamber 18 around the inner end of the larger diameter portion 16 at the inner end of the larger diameter recess 15.

A piston-cylinder means depends from the body 10, and has a fixed member 19 which in the present embodiment constitutes a piston member, and a movable member 20, which in the present embodiment constitutes a cylinder member slidable over the piston member 19. A gasket 21 fitted into a groove 22 in the inner surface of the piston 20 at the open end thereof slides along the outer surface of the piston member 19 to seal the joint between the piston 19 and the cylinder 20. Movement of the piston-cylinder member 20 toward the piston member 19 compressed air in the space 23 within the cylinder member 20.

The fixed member of the piston-cylinder means, i.e. the piston member 19, has a product containing recess 24 therein which opens toward the movable member, i.e. the cylinder member 20. A product pressurizing piston 25 is slidably positioned in the recess 24, and a gasket 26 in a groove 27 in the upper end of the piston 25 seals the piston against the inner wall of the product containing recess 24.

An air return valve is provided at the bottom of the cylinder member 20, and is constituted by a resilient flap 28 held in the closed end of the cylinder member 20 by a pin 29 and covering an air inlet 30. It is preferred that a lateral air inlet passage 31 be provided extending from the air inlet 30 laterally thereof and opening out of the side of the cylinder member 20 so that air return to the interior of the cylinder member 20 will take place even if the finger of a user should accidentally cover the outer end of the air inlet passage 30.

Opening out of the inner end of the product containing recess 24 and extending through the body 10 is a cylindrical bore 32, and extending laterally from the cylindrical bore 32 and opening into the bottom of the smaller diameter recess 14 is a lateral passage 33. The cylindrical bore 32 and the lateral passage 33 together constitute a product flow path through the body 10 from the product containing recess 24 to the nozzle means 11.

A product control valve means is provided in the cylindrical bore 32, and is constituted by a pin 34 having at least one cylindrical groove 35 therein in which is a sealing gasket 36 which slides along the wall of the bore 32 to seal the bore 32. The pin 34 is movable in the axial direction of the bore 32 so that the gasket 36 slides between a position which is located between the product containing recess 24 and the lateral passage 33, and a position in which the gasket 36 is past the lateral passage 33 in a direction away from the product containing recess 24. Thus, movement of the pin 34 in a direction away from the product containing recess 24 opens the product flow path from the product containing recess 24 to the nozzle means 12. In the actual embodiment shown there are two ring gaskets around pin 34 so that the pin is guided linearly along bore 32.

The body 10 further has a compressed air flow path therethrough in the form of a bore 37 which opens out of the larger diameter recess 15 from the compressed air supply chamber 18. The bore 37 extends within the wall of the piston member 19 and opens laterally thereof. It will therefore be seen that the movement of the gasket 21 past the opening of the bore 37 as the cylinder member 20 moves along the piston member 19 acts as a valve to release the compressed air from within the cylinder member 20 into the compressed flow path 37.

A product valve actuator is connected to the product control valve. The end of the body 10 remote from the piston-cylinder means has an upstanding collar 38 thereon. In the bottom of the space 39 within the collar 38 is a projection 10a with a groove 39a defined around the projection 10a. Within the space 39 defined by the collar, into which the bore 32 opens, is positioned an actuator plate 40, which is connected to the end of the pin 34 remote from the product containing recess 24. A cover 41 vented at 41a is fitted tightly over the collar 38, and depending from the center of the cover 41 is a projection 42 around which is a spring 43 which bears on the top of the plate 40. A compressed air passage 44 extends from the compressed air chamber 18 through the body 10 into the space 39, and opens into the groove 39a beneath the plate 40.

With the parts in the positions shown in FIG. 1, it will be understood that fluent product within the product containing recess 24 is at atmospheric pressure, as is any air in the space 23 within the cylinder member 20. There is thus little tendency for product to leak from the apparatus, since it is under no pressure.

Force is exerted on the opposite ends of the dispenser, i.e. on the lower end of the cylinder member 20 and the upper end of the cover 41, as shown in FIG. 1. This will cause the cylinder member 20 to slide upwardly along the piston member 19, compressing air in the space 23. This air will be under increasing pressure, and will exert pressure on the product pressurizing piston 25. The spring 43, however, is sufficiently strong to hold the plate 40 tightly against the bottom of the space 39 within the collar 38 against the force caused by pressure of the product on the bottom of pin 34, thus holding the product control valve closed, i.e. holding the pin 34 with the gasket 36 between the product containing recess 24 and the lateral passage 23.

When the gasket 21 within the cylinder member 20 passes the lateral opening of the compressed air bore 37, however, compressed air at a predetermined pressure will be released suddenly into the compressed air flow path, and will reach the compressed air supply chamber 18 around the nozzle insert 12. It will further flow through the passage 44 and act on the bottom of the plate 40. The area of the bottom of plate 40 is sufficiently large so that the pressure of the air thereon from groove 39a raises the plate 40 against the action of the spring 43, thus moving the gasket 36 upwardly in the bore 32 past the lateral passage 33. Product under pressure is therefore caused to flow through the bore 32 and lateral passage 33 into the central passage 12a of the nozzle insert 12. In the meantime, compressed air is already flowing through the lateral passages 12b of the nozzle into the central passage 12a thereof. Compressed air and pressurized products are thus mixed in the central passage of the nozzle insert 12, and are dispensed laterally of the device.

As the cylinder member 20 continues to move upwardly, it continues to compress the air somewhat within the space 23 to compensate to a certain degree for the escape of air through the compressed air flow path 37. Thus, compressed air at the maximum pressure will continue to flow for a short time after the opening of the valve means for the compressed air. The cylinder member 20 eventually reaches the position shown in FIG. 2 in which it abuts the underside of the body 10, at which point no further air is compressed. The pressure of the air within the space 23 then drops rapidly until it again reaches atmospheric.

When the pressure of the air begins to drop, the pressure beneath the actuator plate 40 falls, and the spring 43 pushes the plate and the pin 34 downwardly, thus closing the product control valve by moving the gasket 36 toward the product containing recess 24 past the lateral passage 33. However, compressed air will continue to flow, at a reduced pressure, beyond this time, thus cleaning from the nozzle insert 12 any product remaining therein.

When the air has been exhausted from the space 23, the cylinder member 20 is drawn downwardly, in FIG. 1, and air flows into the space 23 past the air return valve by lifting the flap 28. The device is then ready for reuse.

By changing the position of the lateral opening from the compressed air bore 37, the pressure at which the compressed air is released can be varied. The farther from the outer end of the piston member 19 is the opening, the higher the pressure at which the air will be released.

Figure 3:
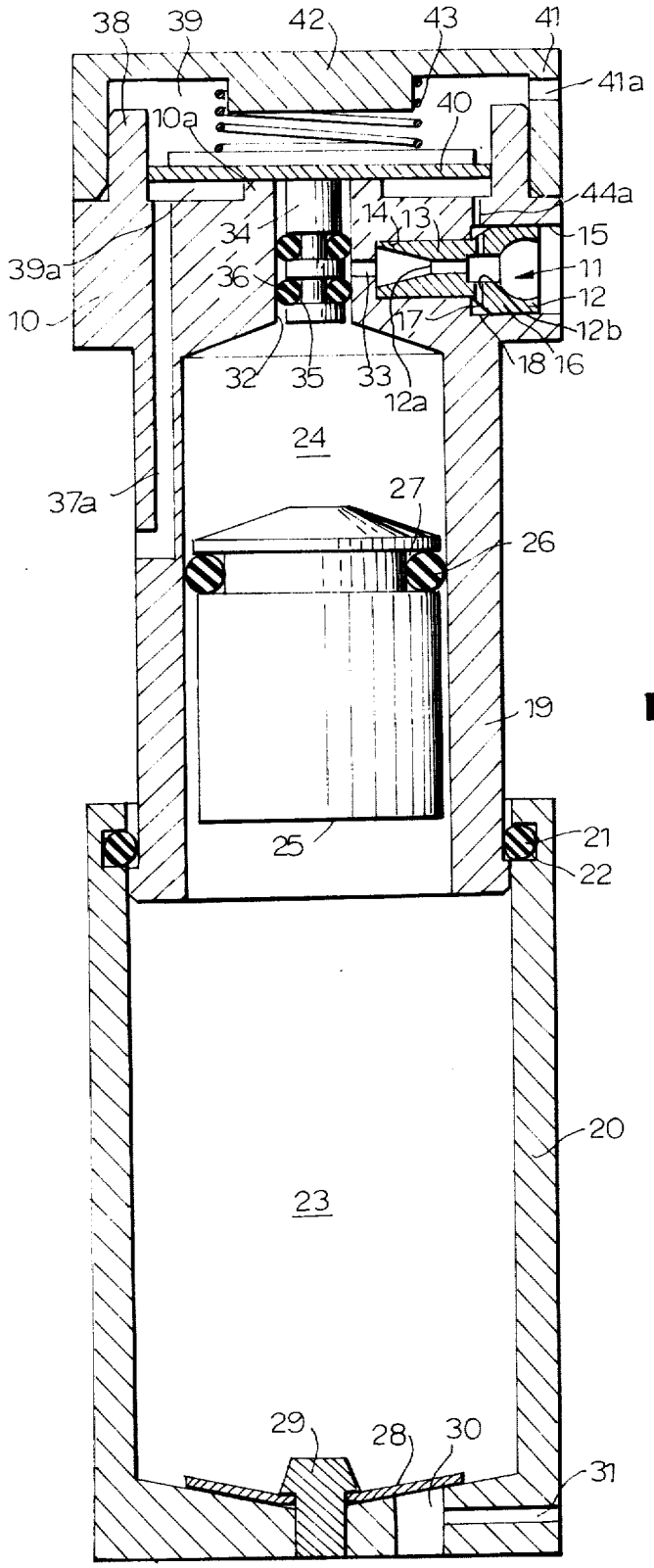
FIG. 3 is a sectional view similar to FIG. 1 of a modified embodiment of the dispensing device.

As seen in FIG. 3, the device can be modified so as to provide the compressed air flow path through a bore 37a located, for convenience in manufacturing, on the opposite side of the device from the dispensing nozzle means 11. In this case, the bore 37a extends directly into the groove 39a around the projection 10a on the upper end of the body. Further, the passage 44a from the groove 39a into the compressed air supply chamber 18 is positioned immediately above the larger recess portion 15, in the illustrated arrangement in a position generally diametrally opposite in the space 39 to the point at which the bore 37a opens into groove 39a.

With this arrangement, by simply varying the size of the passage 44a, the pressure of the compressed air at the dispensing nozzle means 11 can be controlled so as to produce the ratio of air pressure to product pressure which is best for atomizing. The smaller the bore the lower the pressure of the air at the nozzle. In addition, the hole size times the product flow and is thus the main way of controlling the dosage dispensed by the device. This also makes it possible to use the full air pressure to actuate the product control valve in a positive manner, while using the same air to provide air at a lower pressure to the dispensing nozzle means. The existence of the groove 39a around the projection 10a beneath the plate 40 insures that the plate 40 will respond immediately to the presence of air under pressure in the groove 39a.

Many modifications of the construction are possible. For example, the member 19 could be extended to serve as a cylinder member, and a solid piston member could be provided to slide within it. A branch passage could be provided, in the embodiment of FIG. 3, from the bore 37a to the compressed air supply chamber 18, rather than from the groove 39a to the chamber 18. Modifications of the product valve and the gasket 36 could be made.

It will be seen that there has thus been provided a dispenser which dispenses the product by means of a charge of compressed air which is created each time the device is actuated, yet in which the compressed air also serves to exert the pressure to pressurize the product. The device is quite simple, consisting of only a dozen or so parts, some of which are readily available, such as the gaskets 21 and 26 and 36, and the spring 43, and the remainder of which are easily molded on conventional plastic molding machinery. The device can thus be made at a low cost, yet is reliable in operation, and produces a spray of very fine droplets on the order of one to ten microns in size, with a good distribution of the droplets size in the spray and a good spray pattern.

In addition, it will be seen that by the arrangement disclosed, the compressed air starts flowing into the nozzle insert 12 just a very short time ahead of the arrival of the product, i.e. during a delay in which the compressed air reaches and lifts the plate 40. However, because the compressed air pressure soon starts to fall and falls rather gradually, the product control valve closes before the end of the flow of the compressed air, so that the compressed air at the lower pressure at the end of the actuation of the device serves to clean the nozzle insert of any product remaining therein. Moreover, because the opening of the compressed air bore 37 is below the maximum upper position of the cylinder member 20, the cylinder member continues to move and generate further compressed air even after the initial release of the compressed air. This gives a short period of time during which the pressure of the compressed air remains at a maximum, thus promoting good product dispersal.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What is claimed is:

1. A dispenser for dispensing a fine spray by means of compressed air, comprising:

a body having a dispensing nozzle means therein for mixing and dispensing a fluent product and compressed air, a piston-cylinder means depending from said body and having a fixed member in said body and a movable member movable relative to said fixed member for compressing air therebetween, said fixed member having a fluent product containing recess therein opening toward said movable member, a product pressurizing piston in said product containing recess having an end exposed toward said movable member, said body having a product flow path therethrough from said product containing recess to said nozzle means and a product control valve means in said product flow path for controlling flow of product therethrough, said body further having a compressed air flow path therethrough to said nozzle means and compressed air valve means in said compressed air flow path which is opened near the end of the movement of said movable means for releasing compressed air at a predetermined pressure into said compressed air flow path, and a product valve actuator coupled to said product valve, said compressed air flow path opening to said product valve actuator and said product valve actuator being movable in response to the pressure of the compressed air for opening said product valve, whereby when the movable member is moved toward the fixed member for compressing air the compressed air acts on said product pressurizing piston for pressurizing the product, and compressed air at a predetermined pressure is released to said flow path, said valve actuator is moved to open said product valve.

2. A dispenser as claimed in claim 1 in which said compressed air flow path comprises a compressed air bore extending through said body and said fixed member and opening laterally of said fixed member, and said air valve means being a gasket on said movable member of said piston cylinder means movable along a wall of said fixed member and past the lateral opening of said compressed air bore at the position of said movable member where the compressed air is at the predetermined pressure.

3. A dispenser as claimed in claim 2 in which said fixed member is a piston member and the compressed air bore opens laterally outwardly and said movable member is a cylinder, said gasket being on the inner wall thereof movable along the outer wall of the piston member past said lateral opening of said compressed air bore.

4. A dispenser as claimed in claim 1 in which said product flow path through said body is comprised of a product bore opening out of the inner end of the product containing recess, and a lateral bore between said product bore and said dispensing nozzle means, and said product control valve comprises a pin and a gasket around said pin in sliding sealing engagement with the wall of the product bore, said pin being movable between a position in which the gasket is between the product containing recess and the lateral bore and in which the gasket is past the lateral bore.

5. A dispenser as claimed in claim 1 in which said product valve actuator comprises a member responsive to the action of compressed air thereon, said body having a recess in which said member is positioned for movement relative to said body, said member being connected to said product control valve for moving said product control valve in a direction to open the product control valve, and said compressed air flow path comprises a compressed air bore, said compressed air bore opening into said recess against a surface of the member for moving the member in the direction for opening the product control valve when compressed air strikes the member, and bias means acting on said member for urging said member in the direction for closing the product control valve.

6. A dispenser as claimed in claim 5 in which said compressed air bore extends to said dispensing nozzle means and then to said recess, whereby compressed air flow in said nozzle means prior to air reaching the product valve actuator.

7. A dispenser as claimed in claim 6 in which said dispensing nozzle means includes a compressed air supply chamber and said compressed air bore opens into said compressed air supply chamber, and has a further portion extending between said compressed air supply chamber and said recess.

8. A dispenser as claimed in claim 5 in which said compressed air bore extends directly to said recess, and has a further portion between said recess and said dispensing nozzle means.

9. A dispenser as claimed in claim 8 in which said dispensing nozzle means includes a compressed air supply chamber, and said compressed air bore opens into said recess and has a further portion extending between said recess and said compressed air supply chamber, said further portion being positioned substantially diametrally across said recess from the point at which the compressed air bore opens into said recess.

10. A dispenser as claimed in claim 5 in which said body has a cover thereon over said recess, and said bias means are spring means on said cover.

11. A dispenser as claimed in claim 5 in which said member is a plate.

12. A dispenser as claimed in claim 11 in which said body has a projection thereon projecting into said recess against which said plate rests when the product control valve is in the closed condition, said recess having a groove around said projection beneath said plate into which said compressed air bore opens.

13. A dispenser for dispensing a fine spray of a fluent product by means of compressed air, comprising:

a body having a dispensing nozzle means therein for mixing and dispensing a fluent product and compressed air, a piston-cylinder means depending from said body and having a fixed member in said body and a movable member movable relative to said fixed member for compressing air therebetween, said fixed member having a fluent product containing recess therein opening toward said movable member, a product pressurizing piston in said product containing recess having an end exposed toward said movable member, said body having a product flow path therethrough from said product containing recess to said nozzle means and a product control valve means in said product flow path for controlling flow of product therethrough, said body further having a compressed air flow path therethrough to said nozzle means and compressed air valve means in said compressed air flow path which is opened near the end of the movement of said movable means for releasing compressed air at a predetermined pressure into said compressed air flow path, and a product valve actuator coupled to said product control valve for opening said product valve in a predetermined timed relationship to the opening of said compressed air valve means, whereby when the movable member is moved toward the fixed member for compressing air, the compressed air acts on said product pressurizing piston for pressurizing the product.

14. A dispenser for dispensing a fine spray of fluent product by means of compressed air, comprising:

a body having a dispensing nozzle means therein for mixing and dispensing a fluent product and compressed air, a piston cylinder means depending from said body and having a fixed member on said body and a movable member movable relative to said fixed member for compressing air therebetween, a fluent product containing means on said dispenser and product pressurizing means actuable during actuation of said piston-cylinder means for pressurizing the fluent product, said body having a product flow path therethrough from said product containing means to said nozzle means and a product control valve means in said product flow path for controlling flow of product therethrough, said body further having a compressed air flow path therethrough to said nozzle means and compressed air valve means in said compressed air flow path which is opened near the end of the movement of said movable means for releasing compressed air at a predetermined pressure into said compressed air flow path, and a product valve actuator coupled to said product valve, said compressed air flow path opening to said valve actuator and said product valve actuator being movable in response to the pressure of the compressed air for opening said product valve, whereby when the movable member is moved toward the fixed member for compressing air and compressed air at a predetermined pressure is released to said flow path, said valve actuator is moved to open said product valve.

*15. A dispenser head for dispensing a fine spray by means of compressed gas, said head comprising:*

*a body having a dispensing nozzle means therein for mixing and dispensing a fluent product and compressed gas, said body having a product flow path therethrough from one end thereof to said nozzle means and a product control valve means in said product flow path for controlling flow of product therethrough,*

*said body further having a compressed gas flow path therethrough from said one end thereof to said nozzle means; and*

*a product valve actuator means coupled to said product valve, said compressed gas flow path opening to said product valve actuator means and said product valve actuator means being movable in response to a predetermined pressure of the compressed gas for opening said product valve,*

*whereby when compressed gas is caused to flow through said compressed gas flow path, said product valve actuator means is moved to open said product valve when the compressed gas reaches the predetermined pressure and to close said product valve when the compressed gas falls below the predetermined pressure.*

* * * * *

UNITED STATES PATENT AND TRADEMARK OFFICE

CERTIFICATE OF CORRECTION

PATENT NO. : RE 29,176

DATED : April 12, 1977

INVENTOR(S) : Herbert H. Loeffler

It is certified that error appears in the above-identified patent and that said Letters Patent are hereby corrected as shown below:

In the title page, line [73] Assignee: Arthur D. Little, Inc., Cambridge, Mass.

should read --[73] Assignee: Ciba-Geigy Corporation, Greenburgh, N. Y. --.

Signed and Sealed this

Thirtieth Day of May 1978

[SEAL]

Attest:

RUTH C. MASON
Attesting Officer

LUTRELLE F. PARKER
Acting Commissioner of Patents and Trademarks